Aug. 20, 1957 A. FREEMAN 2,803,333
CONVEYOR SYSTEM
Filed June 24, 1954 5 Sheets-Sheet 1

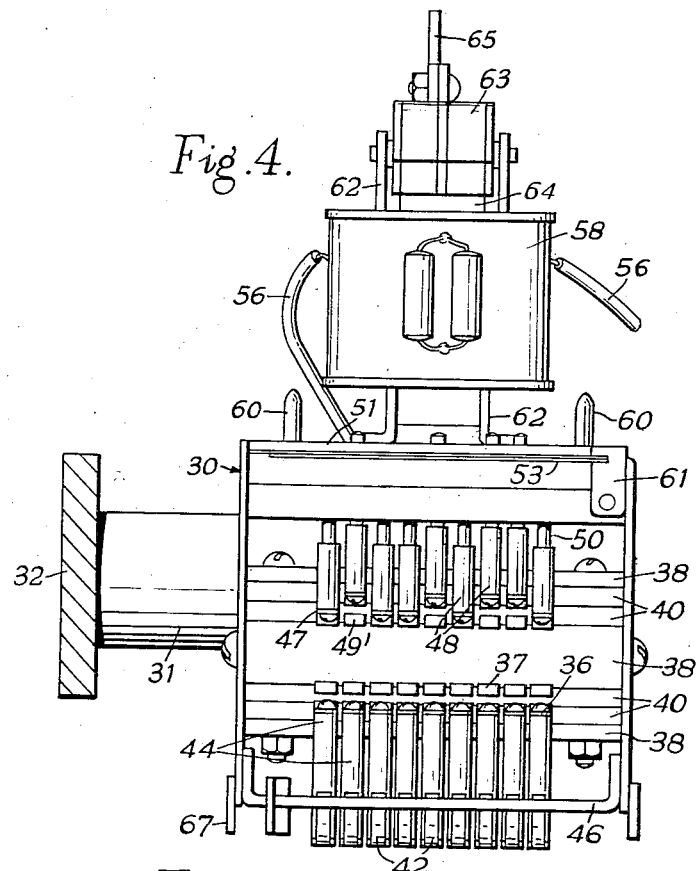
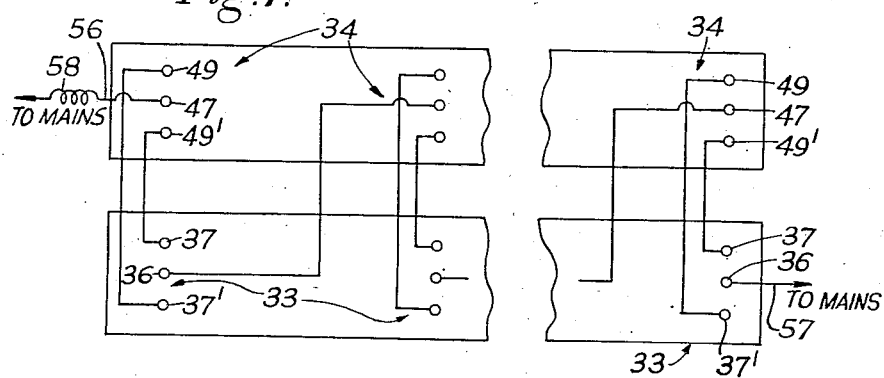

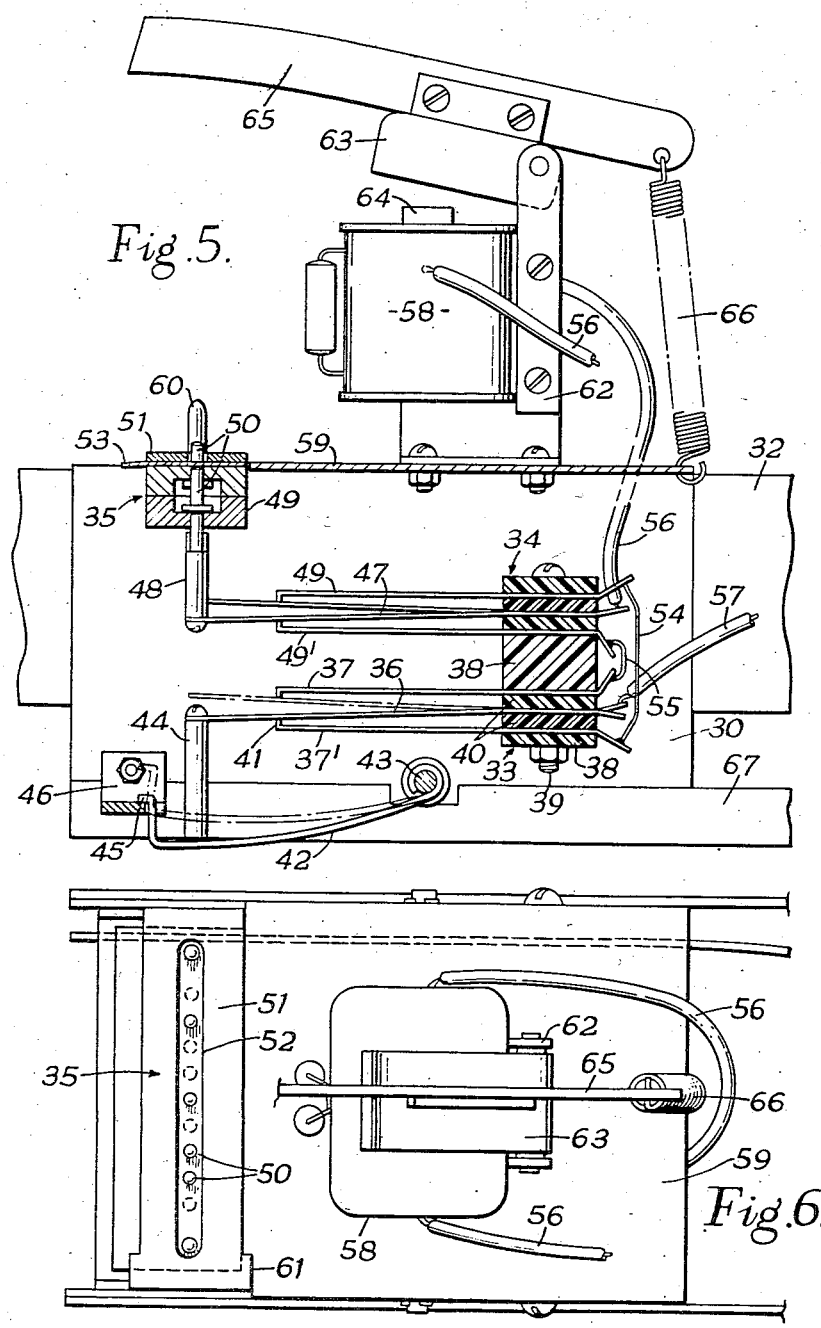

2,803,333

CONVEYOR SYSTEM

Alfred Freeman, Isham, near Kettering, England

Application June 24, 1954, Serial No. 439,091

Claims priority, application Great Britain April 29, 1953

11 Claims. (Cl. 198—38)

The present invention is concerned with conveyor systems by means of which goods can be transported and can be delivered to be dealt with automatically at a predetermined place along the system.

The present invention is concerned with conveyor systems of this character and which comprises a conveyor for transporting goods, a plurality of index devices which are permanently or detachably secured to the conveyor in association with particular goods or batches of such goods and each comprise a set of elements which can be "projected" or "retracted" to identify a particular combination, and a plurality of readers which are sited at various positions along the conveyor and which are each responsive to a particular index setting so as to select an index device exhibiting that combination and accordingly to trip means acting on the goods associated with that particular device. The action of the last-mentioned means may be to discharge the goods, to bring a machine or tool into action thereon, to bring some treating medium into contact with the goods, to vary the temperature at a particular zone through which these goods pass, or otherwise deal with them.

The present invention provides a reader operating means comprising a bank of switches having interconnected fixed contacts and having movable contacts disposed in use for actuation, in response to the passing of appropriately-disposed elements of an index device, to close an electrical circuit causing the operation of a trip device. Thus the switches will be arranged and connected so that when, and only when, a passing index device exhibits a particular combination (in order and position) of projections and retractions these switches will be able to close and energise a circuit for effecting the desired tripping operation.

Hence, in a simple form, the switches may comprise a set of two-position switches, the movable contacts of which are arranged so as to be closed by an "up" or a "down" index element, as the chosen case may be, and so that when they are all closed a series circuit is made for the required energisation. Thus, for instance, the correct actuation of all the switches may be used to couple a solenoid coil to the mains supply, the resultant movement of the solenoid core unlatching a catch governing a mechanism for discharging goods from the conveyor or the movement of a tool into action on work carried on the conveyor.

The present invention also includes a development, in which provision is made for changing, at will, the acceptable combination of index projections and retractions (including all elements projected or all retracted) to which the reader will respond. Hence, by this feature of the present invention the reader incorporates or has associated therewith a setting device comprising a set of individually-operable elements which, according as they are projected or retracted relatively to a datum position, will control the positioning of a corresponding part of the switch means of the reader thereby, in effect, to change the combination acceptable to the reader.

In carrying this feature into effect, the arrangement may be chosen in which the switch means is subdivided into two component sets of switches, one of which (the index set) is disposed for operation by passing index devices of the conveyor system whilst the other (the control set) is settable to different combinations, at will, to vary the index combination to which the switch means is responsive for operating the trip device.

One very important development arising from this breakdown of the electrical switches into a control component set and an index component set, is that the two components can, if desired, be physically separated, since only electrical connections are required between them. Thus, for instance, the control component can be established in a control centre away from the conveyor, this arrangement enabling, say, the acceptable combination at the various stations along a conveyor circuit to be remotely controlled and changed according to requirements. Hence, if the control switch sets of the various readers of a conveyor system were to be grouped at a control centre, the whole or any part of the discharge programme or any other factors controlled by the readers could be rapidly changed from a distance.

One embodiment of the invention is illustrated in Figures 1 to 3 of the accompanying drawings, in which Figure 1 is a front view of part of the conveyor system showing the reader mechanism and the operating means thereof, with an index device passing the same, this view being partly in section on the line I—I of Figure 2.

Figure 1:
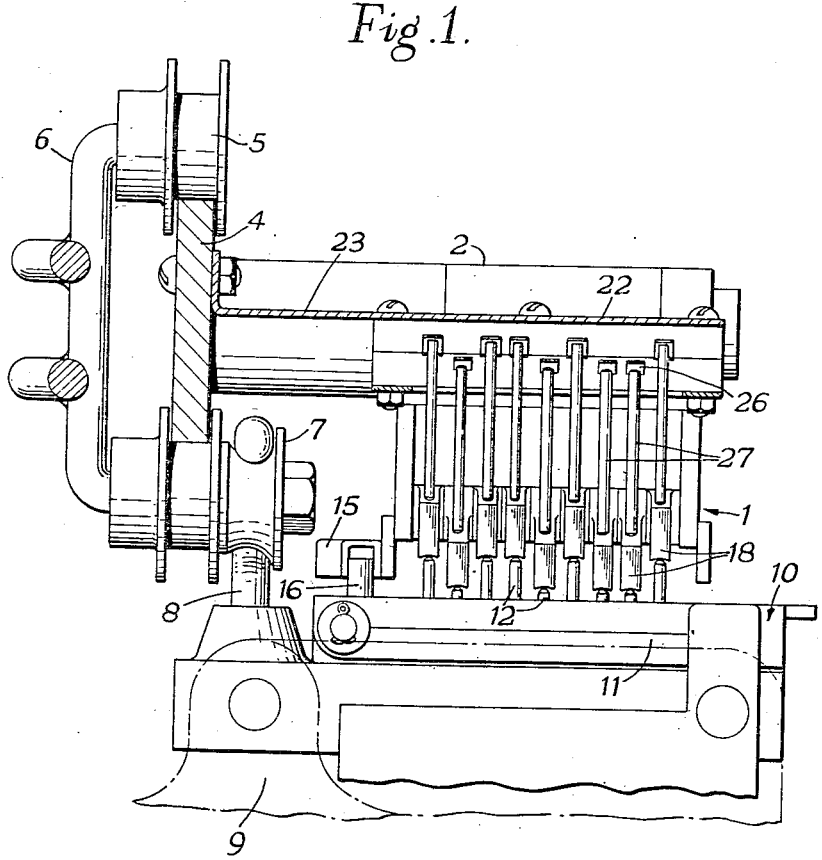

The conveyor system illustrated comprises an endless conveyor chain made up of links 6 having wheels 5 running on a track bar 4. Certain of the links 6 carry an auxiliary wheel 7 on which a hook 8 of the work carrier bag is suspended. This carrier, which is generally designated 9 in the drawings, is provided with an index device 10 comprising a two-part housing 11 which slidably receives a row of pins 12, each of which can be either projected upwards, or retracted, and the assembly of pins forming a combination for selecting the particular reader station at which the work carrier 9 will be discharged as a result of an abutment being brought into contact with the free end of the hook 8.

The readers, with which the index devices cooperate and "test" as they pass around the conveyor circuit, each comprises a frame 1 with a pair of side cheeks which is suspended from a sleeve 2 mounted on a rod 3 projecting laterally from the track bar 4. The frame 1 of the reader is suspended from the sleeve 2 by means of a depending pin 13, which is integral with the latter and is received in a socket 14 in this frame, so as to allow a certain amount of all round play and thus adjustment of the frame 1 to oncoming index devices. Such self-adjustment is provided for by the use of a channel 15 at the side of the frame, this co-operating with an upstanding stud 16 on the index device 10. In addition a spindle 17 is mounted between the side cheeks of the frame 1 and has threaded thereon a series of transfer fingers 18 which are positioned for co-operation each with one of the index elements 12. Hence each transfer finger is curved at its underside and is there provided with a guide groove for receiving the upper end of the corresponding pin 12. In addition, each finger 18 is provided with a tail 19, and a stop pin 20 is disposed between the side cheeks of the reader frame 1, so as to limit the downward tipping under gravity, of the outer ends of these fingers.

Figure 2:
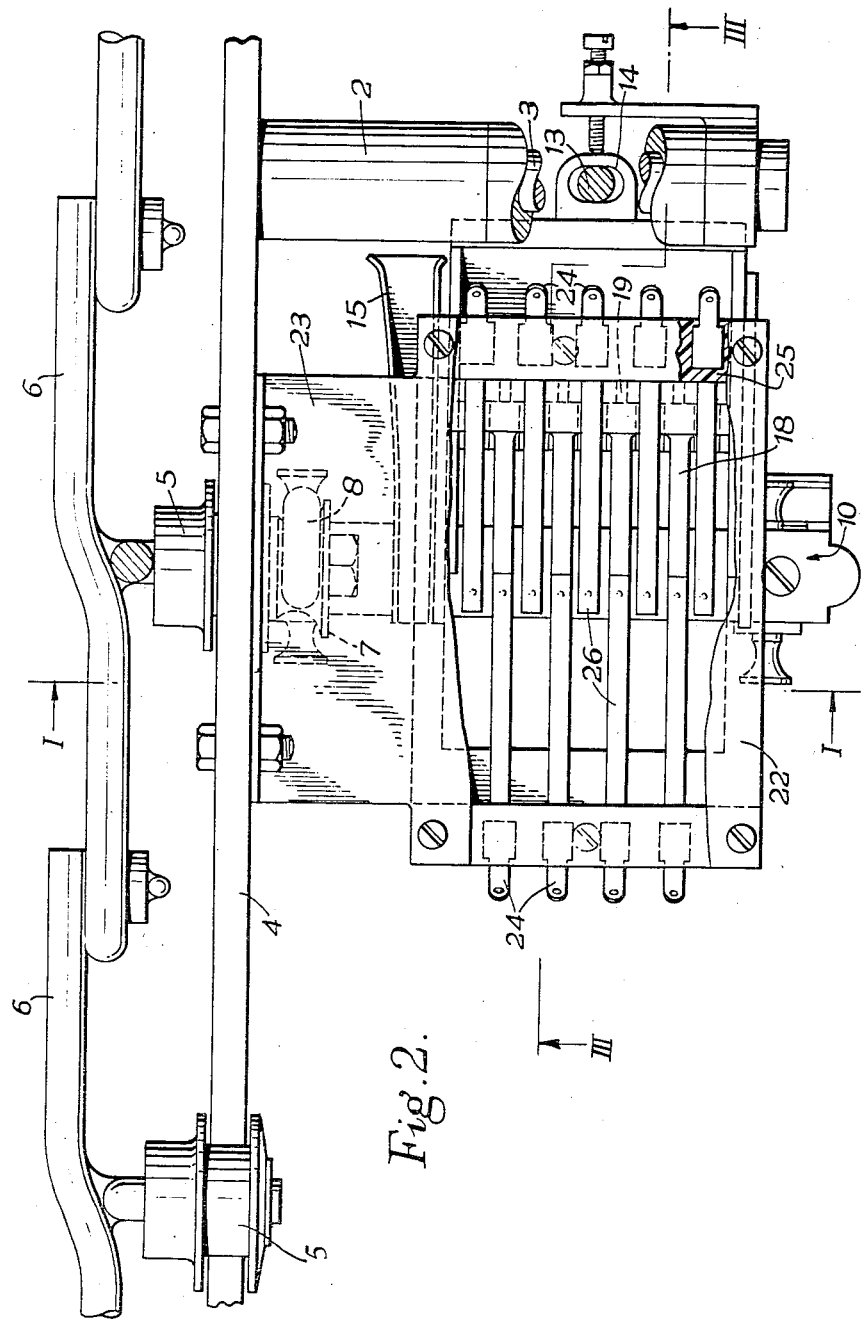
Figure 2 is a plan view of the assembly seen in Figure 1.
Figure 3:
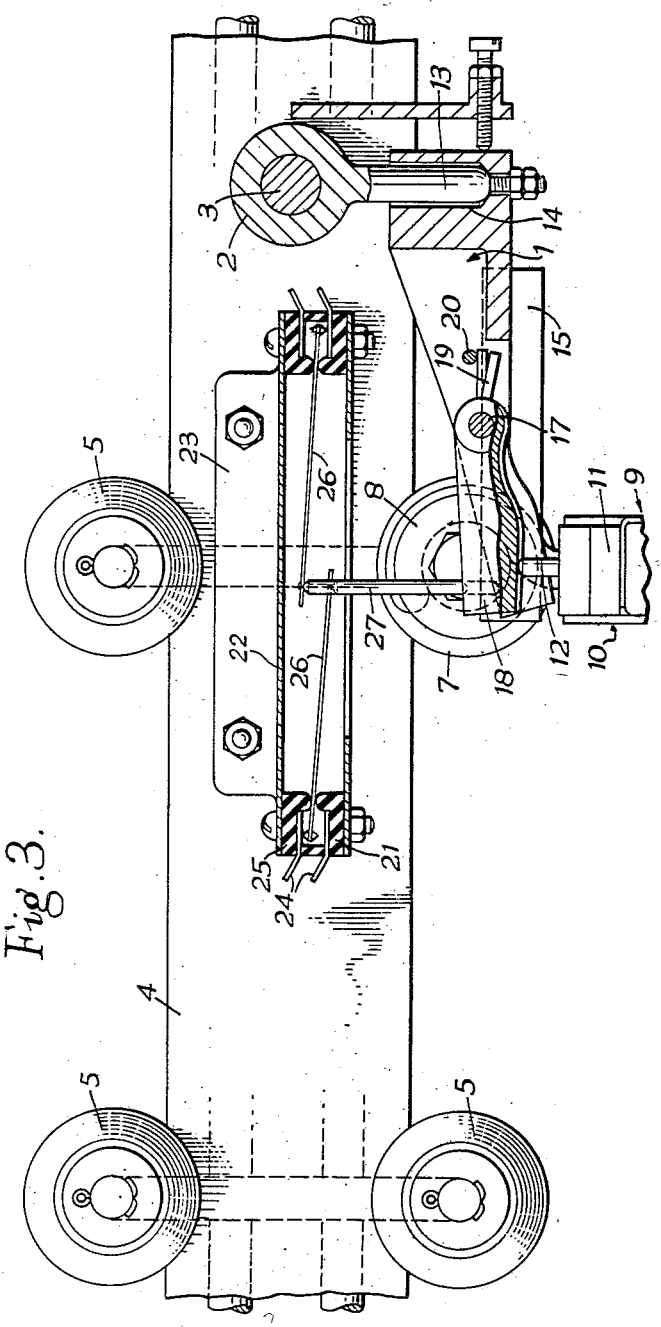
Figure 3 is a side view of the same arrangement, partly in section on line III—III of Figure 2.

In accordance with the present invention, an electrical reader operating means is associated with the reader mechanism so far described, this comprising, in the embodiment of Figures 1 to 3, a bank of micro-switches each generally designated 21 arranged in two sets at opposite ends of a casing 22 which is attached to the track bar 4, by a bracket 23, above the frame 1.

As will be seen from the drawing, there are, in fact, nine switches 21 arranged in two groups respectively four and five in number, at the opposite ends of casing 22. Moreover, each such switch, as shown in exaggereated fashion in Figure 3, comprises two fixed contacts 24 disposed in an insulating block 25 and having their outer ends disposed externally of casing 22, and a movable switch 26 in the form of a blade which is rockable for contact alternatively with the upper or lower fixed contact 24. As will be seen particularly clearly from Figure 2, these various movable contact blades 26 of the two sets of switches of the bank are arranged so that their ends are disposed side by side across the centre line of the casing 22 and, from Figure 3, that these ends are thereby disposed each above the outer end of a corresponding transfer finger 18.

A mechanical connection in the form of a pin 27 which is tapered at its two ends, provides a coupling between each finger 18 and the corresponding movable contact blade 26, the pin 27 being a loose push fit in between a recess or aperture furnished respectively in the finger and blade concerned.

As will therefore be understood, the action, in each case, of a projected passing index pin 12 will be to lift the finger 18 concerned and hence the corresponding switch blade 26, thereby bringing the latter into engagement with the lower of the two fixed contacts 24 of the switch concerned. Similarly a retracted index pin 12 will result in the corresponding transfer finger 18 remaining in its "down" position and hence the engagement of the corresponding blade contact 26 with its upper fixed contact 24.

From this it will be clear that, by appropriately interconnecting one or other of the fixed contacts 24 of each switch with one or other of the fixed contacts in the next switch, and so on, a series circuit will be established if and when a passing index device 10 exhibits a predetermined combination of projected and retracted elements. On the other hand, any element 12 failing to comply with this combination will prevent the series circuit from being made.

Such a circuit, it will readily be understood, can be used to operate an electro-magnetic means for bringing into operation, a trip lever, catch or the like for the required purpose, in this case for abutment with the end of hook 8 to eject the associated carrier 9 from the chain.

As will be understood, the loose mechanical connection provided for by the pins 27 allows for a certain amount of movement of the reader frame 1 to compensate for mal-positioning of the passing index device 10, without interfering with the operative connection between the various fingers 18 and the blades 26. It may, however, be found more convenient to mount the casing 22 containing the switchgear directly on the frame 1 or the support 3 therefor, so that the two carry out an adjusting movement in concert, and this possibility, of course, is not excluded in the present invention.

Again it will be appreciated that the pins 27 themselves are only given as examples of a form of mechanical coupling which may be employed and that this could, to cite one instance, be replaced by the coupling sleeve arrangement which is described hereafter in connection with a second embodiment of the invention.

As will be further understood, the electrical reader switches can be used for purposes additional to the tripping of means acting on the passing goods. Thus, for instance, one or more of the switches could be operable, by the passing index device itself, or by some other means (e. g. the trip means) to transmit an electrical signal to a control centre or elsewhere for illumination of a signal lamp indicating that the reader concerned has been operated.

This introduces many further possible possibilities of which the following may be mentioned.

The switches may be connected up in groups, e. g. one group for the normal tripping function described in the foregoing and the remainder into one or more groups, or single switches, each controlling a separate circuit. One of these auxiliary groups or switches could be used to notify a remote progress control and it is when a particular reader has been operated, e. g. by illumination of a corresponding lamp on a control board. Another could be used simultaneously to light a tell-tale lamp at the reader station concerned to warn an operative that certain goods has arrived there, and so on.

Again, these additional circuits can be utilized to indicate at a control centre that goods had arrived at a specific station but could not be discharged there since the station was too full to accept them. In this event, a further switch or relay could be used to open some other station to receive these goods, this also being electrically notified to the control centre, as is also the eventual acceptance of the goods at this further station.

It is also possible that it is only required to notify the control centre or office of, say, the delivery of a certain style of articles within a particular size range deposited from the conveyor at a particular station. In a case of this sort, a correlated index element of the index device concerned could be set to operate a switch to impart a corresponding signal only in the event that goods of this style are carried.

Further, the setting of "spare" elements of the index devices can be used to operate switches of the reader stations through which the device passes so as to give the control centre indication of the progress along the conveyor run of the work or goods associated with these spare elements.

An illustration of another embodiment of the invention incorporating further important features comprised within the latter is illustrated in Figures 4 to 7 of the accompanying drawings in which, Figure 4 is an end view of the electrical reader operating means here concerned.

Figure 5 is a side view of the same, partly in vertical section,

Figure 6 is a plan view of these operating means and

Figure 7 is a diagram illustrative of the electrical connections employed.

The mechanism illustrated in Figures 4 to 7 comprises a frame or casing, generally denoted 30, which is mounted on an arm or bracket 31 extending laterally from the conveyor chain track bar 32 at the particular station concerned, i. e. a discharge or operating station according to the particular use to which this embodiment of the invention is to be applied.

This frame 30 carries switch means operable by oncoming index devices on a work-carrying conveyor chain running on the track bar 32. The switch means control the energising circuit of a solenoid which in turn governs the actuation of a trip catch for initiating the operation to which the station is dedicated, e. g. the discharge of work or the bringing into action of a tool or mechanism acting on this work.

In the particular instance here dealt with, the reader is responsive to an index device similar to that illustrated in Figures 1 to 3 and having nine aligned vertical pins, and its operating means is divided into two banks 33 and 34 each consisting of nine switches. The switches 33 of the lower bank (i. e. the index set referred to above) are arranged in alignment transversely of the frame 30 and at intervals corresponding to the spacing of the pins of the passing index devices. The second component part of the switching means, viz. the control set 34, consists of another nine switches which are, for convenience, here mounted across the frame 30 above the index set 33, and a punched card setting device 35 is used in co-operation with this control switch set 34 for varying the index combination acceptable at this reader station.

Hence each switch 33 of the index set is constituted by three contacts of blade form, viz. a movable blade 36 and two outer blades 37 and 37'. These blades are clamped together in vertical register at or towards their rear ends and extend parallel to the direction of travel of the conveyor chain at the station. The clamping is effected by plates 38 and bolts 39 common to all the switches of the set and disposed transversely across the mounting frame, with interposed plates 40 of insulating material.

Of the three contact blades of each switch the middle one 36 is the movable contact and is capable of being shifted into contact with an inturned end portion 41 of the upper (37) or lower (37') fixed (actually slightly resilient) contact blade, according to the position of the corresponding plunger pin of a passing index device.

Hence there is provided beneath each switch a transfer finger 42 comprising a metal strip of slightly downwardly bowed form which is disposed at one end around a cross rod 43 common to all the transfer fingers so that, if the corresponding pin on the passing index device is in the raised position it will lift the outer end of this finger and thereby, through a coupling sleeve 44, the middle and movable contact 36 of the switch concerned to bring the blade 36 into engagement with the upper fixed contact 37 of the switch. In the event that the index pin is "down," the transfer finger 42 concerned will remain inoperative and the movable contact 36 will engage the lower fixed contact 37' of the switch. Each of the transfer fingers 42 is formed with a nose 45 at its forward and outer end which co-operates with a cross piece 46, also on the frame, limiting the downward rocking of these fingers.

The control set of switches 34 are formed and arranged similarly to the first set 33, but in this case each of the movable central contact blades 47 is biased upwards and carries at its outer end a socketed pin 48 co-operating with the punched card setting device 35. The fixed contact blades 49 and 49' of each switch of this set are formed and disposed similarly to the blades 37 and 37' of the lower and index set, and it will be seen that the anchored ends of the switch blades of both sets are clamped in a common block, using the same clamping bolts 39.

The setting device 35 is of bar form, having a two part, hollow housing 49 receiving a series of collar-provided sliding pins 50 and having, at its upper side, a pivotable plate 51 furnished with a slot 52 and serving for the clamping in position of a punched card 53 with an aligned combination of holes therein. When a card is inserted in the device and impaled on fixed end pins 60, and the pivoting plate 51 clipped down into position with lugs 61 on this plate embracing one end of the housing 49, the selector pins 50 of the device will be pressed down or remain up, according to where they register with a perforation in the punched card or not, and as a result the corresponding central and movable contact blade 47 of the corresponding control switch will make contact with the lower (49') or the upper (49) fixed contact of the switch, as the case may be.

The two component sets of switches are interconnected electrically at their rear ends, the arrangement being that permanent electrical connection, as typified by the conductor 54 in Figure 5, exists between the outer fixed contacts, 37' and 49 respectively, of each pair of superimposed switches, one in each set, and a similar connection, see 55, between the two inner fixed contacts 37 and 49' of the two switches in question. The arrangement is diagrammatically illustrated in Figure 7, and from this it will be seen that the central movable contact 36 of a lower index switch is connected to the movable central contact 47, not of the control switch immediately above it, but of the next adjacent upper switch, and that there is a lead 56 from the central contact of the first switch of the control set, and a lead 57 from the central contact of the final switch of the index set, to mains, the lead 56 connecting to mains through the winding of a solenoid 58 mounted on the reader frame above the switch means described.

This solenoid is mounted on a platform 59 on the frame 30 by a bracket 62, which also has a pivoted arm 63 built up of laminated magnetic strips and co-operating with the core 64 of the solenoid. This arm 63 carries a latching lever 65 biased by a tension spring 66 which in turn co-operates with a rocking assembly including a trip catch (not shown) such that, when the solenoid core is energized the latching lever 65 is rocked forwards and downwards thereby to bring the trip catch into its operative position, whereas at other times the latching lever allows this catch to remain inoperative.

Hence, when an index device set to an acceptable combination passes beneath this reader, the switches 33 of the lower index set are set to cause the closure of a series circuit through the solenoid winding and hence the operation of the trip means, whereas an unacceptable index combination will control the corresponding movable contacts 36 of the lower set of switches in a manner to preclude the closure of this circuit, thus leaving the trip means inoperative. Further, the combination which is acceptable to the index switch set is governed at all times by the combination to which the control set of switches 34 is set by the punched card setting device 35 so that, by simply substituting another card in this device, the combination to which the particular station is responsive can immediately be changed.

It is here to be noted that the projections and retractions of the travelling index device and the setting device 35 are, in effect, oppositely-acting, but that the particular switch connections described are such as to allow for use of identical punched card strips in the correlated index devices and setting devices.

It is also to be noted that, to preclude premature closing of the operating circuit through the solenoid 58, due to possible lag in the closure of any of the index switches 33 producing an unreal combination which might nevertheless be such as to produce instantaneous completion of the circuit, an extra switch will advantageously be included in the circuit and remain open until such time as all the pins of the passing index device are sure to have reached their effective positions relatively to the index switch set.

Conveniently this safety switch may be similar in form to those described above and be incorporated in the index set as a tenth switch, but be operable by a part on every passing index device at a position such that the trip-governing circuit will only be closed at a time when the intended positioning of the index switches is ensured.

Again, having regard to the need for accurate registration of the pins of the passing index devices with the first set of switches, the reader frame will preferably, as illustrated, have a guide channel 67 for a stud or the like on the passing index devices.

I claim:

1. A conveyor system of the character set forth comprising a conveyor, a plurality of index devices travelling with said conveyor and each comprising a set of index elements each adapted to be individually and selectively set in a projected or in a retracted position, readers disposed at fixed locations along the conveyor path in the line of travel of the index devices, each reader having operating means comprising at least one bank of switches with interconnected fixed contacts and with movable contacts adapted for actuation by elements of a passing index device, and a trip device operable by closure of an electrical circuit controlled by said bank of switches.

2. A conveyor system of the character set forth comprising a conveyor, a plurality of index devices travelling with said conveyor and each comprising a set of index elements each adapted to be individually and selectively set in a projected or in a retracted position, readers disposed at fixed locations along the conveyor path in the line of travel of the index devices, each reader having operating means comprising at least one bank of switches disposed for actuation by appropriately set index elements of a passing index device, each said switch having a contact movable to alternatively engage one or the other of a pair of fixed contacts of the switch, and an electromagnetic trip device to initiate action on goods passing with the conveyor, selected fixed contacts of the various switches being connected in circuit with said trip device, whereby the passing of an appropriately set index device makes said circuit to energize the trip device.

3. A conveyor system of the character set forth comprising a conveyor, a plurality of index devices travelling with said conveyor and each comprising a set of index elements each adapted to be individually and selectively set in a projected or in a retracted position, readers disposed at fixed locations along the conveyor path in the line of travel of the index devices, each reader having operating means comprising at least one bank of switches disposed for actuation by appropriately-set index elements of a passing index device, each said switch having a contact movable to alternatively engage one or the other of a pair of fixed contacts of the switch, a plurality of transfer fingers each positioned below one of said movable contacts and in the path of a projected element of passing index devices, so as to be moved by such element and transmit the movement to the associated movable switch contact, and an electromagnetic trip device to initiate action on goods passing with the conveyor, selected fixed contacts of the various switches being connected in circuit with said trip device, whereby the passing of an appropriately-set index device makes said circuit to energize the trip device.

4. A conveyor system as defined in claim 3 and in which said movable contacts are blades, said operating means further comprising a mechanical element connected between each transfer finger and the corresponding movable switch blade contact.

5. A conveyor system of the character set forth comprising a conveyor, a plurality of index devices travelling with said conveyor and each comprising a set of index elements each adapted to be individually and selectively set in a projected or in a retracted position, readers disposed at fixed locations along the conveyor path in the line of travel of the index devices, each reader having operating means comprising at least one bank of switches disposed for actuation by appropriately-set index elements of a passing index device, each said switch having a contact movable to alternatively engage one or the other of a pair of fixed contacts of the switch, an electromagnetic trip device to initiate action on goods passing with the conveyor, selected fixed contacts of the various switches being connected in circuit with said trip device, whereby the passing of an appropriately-set index device makes said circuit to energize the trip device, and a safety switch in the trip circuit and operable by a passing index device to complete this circuit after operation by this device of the selected movable contacts.

6. A conveyor system of the character set forth comprising a conveyor, a plurality of index devices travelling with said conveyor and each comprising a set of index elements each adapted to be individually and selectively set in a projected or in a retracted position, readers disposed at fixed locations along the conveyor path in the line of travel of the index devices, each reader having operating means comprising at least one bank of switches disposed for actuation by appropriately-set index elements of a passing index device, each said switch having a contact movable to alternatively engage one or the other of a pair of fixed contacts of the switch, a setting device comprising a set of individually-operable elements each adapted to be projected or retracted relatively to a datum position to control the positioning of a corresponding part of the switch means of the reader, thereby to change the index combination acceptable to this reader, and an electromagnetic trip device to initiate action on goods passing with the conveyor, selected fixed contacts of the various switches being connected in circuit with said trip device, whereby the passing of an appropriately-set index device makes said circuit to energize the trip device.

7. A conveyor system as defined in claim 6, in which the switch means comprise a set of index switches disposed for operation by passing index devices, and a set of control switches settable at will to different contact combinations to vary the index combination to which the switch means are responsive for operating the trip device.

8. A conveyor system of the character set forth comprising a conveyor, a plurality of index devices travelling with said conveyor and each comprising a set of index elements each adapted to be individually and selectively set in a projected or in a retracted position, readers disposed at fixed locations along the conveyor path in the line of travel of the index devices, each reader having operating means comprising two interconnected sets of switches, viz. an index set operable by passing index devices, and a control set in which each switch has a movable contact for alternative engagement with one or other of a pair of fixed contacts, a setting device for varying, at will, the contact engagement in each of the control switches thereby to vary the index combination acceptable to the set of index switches, and a trip device operable in response to the closure of the index switches in accordance with this acceptable combination.

9. A conveyor system as defined in claim 8, in which each switch of both the index set and the control set includes two fixed contacts and a third movable, in the case of the index set by a projected index element of a passing index device and in the case of the control set by the corresponding element of the setting device, to engage one or other of the fixed contacts, and in which the corresponding pairs of fixed contacts of each associated pair of control and index switches are electrically interconnected, whilst the movable contact of each control switch is connected to the movable contact of the next-adjacent switch of the index set, and the movable contacts of the end switches are connected in circuit with the trip device.

10. A conveyor system as defined in claim 8, in which the control switch set and the setting device are located at a distance from the index switch set and from the conveyor.

11. A conveyor system as defined in claim 8, in which the setting device comprises a set of plungers or pins individually slidable in a mounting under the dictation of a punched card.

References Cited in the file of this patent

UNITED STATES PATENTS

| | | |
|---|---|---|
| 1,172,080 | Voigt | Feb. 15, 1916 |
| 2,315,659 | Russell | Apr. 6, 1943 |
| 2,328,317 | Wentworth | Aug. 21, 1943 |